United States Patent [19]
Naito et al.

[11] Patent Number: 5,656,800
[45] Date of Patent: Aug. 12, 1997

[54] ACCURATE AND RESPONSIVE WEIGHING APPARATUS WITH DRIFT COMPENSATION

[75] Inventors: Kazufumi Naito; Kouji Itoh, both of Kurita-gun, Japan

[73] Assignee: Ishida Co., Ltd., Kyoto, Japan

[21] Appl. No.: 719,032

[22] Filed: Sep. 24, 1996

Related U.S. Application Data

[63] Continuation of Ser. No. 140,068, filed as PCT/JP93/00251, Feb. 26, 1993, abandoned.

[30] Foreign Application Priority Data

Feb. 28, 1992 [JP] Japan ..................... 4-79262

[51] Int. Cl.$^6$ ..................... G01G 19/22; G01G 13/00
[52] U.S. Cl. ..................... 177/25.13; 177/25.18
[58] Field of Search ..................... 177/25.11, 25.13, 177/25.18; 364/567; 341/143

[56] References Cited

U.S. PATENT DOCUMENTS

| | | | |
|---|---|---|---|
| 4,836,310 | 6/1989 | Yamano | 177/25.18 |
| 4,846,291 | 7/1989 | Osawa et al. | 177/25.18 |
| 4,853,881 | 8/1989 | Yamada | 177/25.18 X |

FOREIGN PATENT DOCUMENTS

| | | |
|---|---|---|
| 0464223 | 1/1982 | European Pat. Off. . |
| 0216638 | 6/1988 | European Pat. Off. . |
| 0418567 | 3/1991 | European Pat. Off. . |
| 0495280 | 7/1992 | European Pat. Off. . |

OTHER PUBLICATIONS

DeFreitas, Richard, "The Low Cost Way to Send Digital Data" *Electronic Design* Jan. 18, 1974, pp. 68–73.

Krentes, Rodney, "Delta Modulation: The Forgotten A/D Converter" *Modern Electronics* May 1987, pp. 20–22 and 89.

Elbit–Ati, Ltd. WO 93/07679, Apr. 15, 1993.

M. Byrne et al., "Kleinste Signale—präzise gemessen," Elektronik, vol. 41, No. 4, Feb. 18, 1992, pp. 44–53.

F. Goodenough, "Grab distributed sensor data with 16–bit delta–sigma ADCs," Electronic Design, vol. 36, No. 9, Apr. 14, 1988, pp. 49–56.

M. Rebeschini et al., "A 16–bit 160 KHZ CMOS Converter Using Sigma–Delta Modulation," IEEE 1989 Custom Integrated Circuit Conference, May 15–18, 1989, pp. 611–615.

*Primary Examiner*—Michael L. Gellner
*Assistant Examiner*—Randy W. Gibson
*Attorney, Agent, or Firm*—Sughrue, Mion, Zinn, Macpeak & Seas

[57] ABSTRACT

In order to increase both the weighing accuracy and the weighing speed of a weighing apparatus, a delta-sigma analog-to-digital converter (4) having a cut-off frequency higher than that of an analog filter (3) is connected with the output of the analog filter (3). Also, in order to perform a quick drift correction of an amplifier (2), the analog filter (3) is selectively switchable so as to perform a filtering function during a weighing mode and to perform a buffering function during a correction mode correcting means (52) is provided for storing the digital signal from the delta-sigma analog-to-digital converter (4) as a drift signal (df) during the correction mode and for providing a corrected digital weight signal (d2) by subtracting the drift signal (dr) from the digital weight signal (d1) obtained from the delta-sigma-type analog-to-digital converter (4) during the weighing mode.

16 Claims, 7 Drawing Sheets

ACCURATE AND RESPONSIVE WEIGHING APPARATUS WITH DRIFT COMPENSATION

This is a continuation of application Ser. No. 08/140,068, filed as PCT/JP93/00251, Feb. 26, 1993, now abandoned.

FIELD OF TECHNOLOGY

The present invention relates to an electronic weighing apparatus wherein, after an analog weight signal obtained by detecting the weight of a load has been amplified, a digital weight signal for display of the weight of the load can be generated.

BACKGROUND ART

In conventional electronic weighing apparatus, an AD (analog-to-digital) converter for converting an analog weight signal, outputted from a load cell (a weight detector), into a digital signal has hitherto been employed in the form of either a double integral model (See lines 13 to 14 in bottom left column on page 4 of the Japanese Laid-open Patent Publication No. 62-69125) or a successive comparison model. The former has a problem in that, when the resolution is desired to be increased, the response tends to be considerably lowered, whereas the latter has a problem in that the resolution is low although the response is high.

In view of the above, it has been suggested to use a delta-sigma-type AD converter (hereinafter referred to as a "$\Delta\Sigma$-type AD converter") capable of giving high resolution (that is, a high accuracy) and having a response superior to that of the double integral model. This $\Delta\Sigma$-type AD converter has a low-order modulator for effecting a voltage-frequency modulation of an analog signal and a digital filter both built therein and is inexpensive. The modulator used therein can output a small quantity of information (1 bit) at an extremely high rate while the digital filter used therein can accomplish a high resolution filtering at a low rate.

However, the digital filter built in the $\Delta\Sigma$-type AD converter has a problem in that, since such a digital filter accumulates sampling data corresponding to the number of times over which the digital signal due to its peculiar sampling calculation has been inputted, a delay in time tends to occur in the output. Consequently, the response cannot be regarded sufficiently high. In particular, when the cut-off frequency of the digital filter referred to above is chosen to be low in order to increase the weighing accuracy accomplished by the $\Delta\Sigma$-type AD converter, the amount of sampling calculation tends to increase, accompanied by an increased delay in outputting. This delay is expressed in terms of settling time. The lower the out-off frequency of the digital filter, the longer the settling time, and the longer settling time results in deterioration of the follow-up characteristic relative to an abrupt change of the input. Accordingly, if using only the digital filter built in the $\Delta\Sigma$-type AD converter, the filtering is carried out to a level at which no practical problem occur, the cut-off frequency tends to be considerably lowered but the response tends to be correspondingly reduced.

In this type of electronic weighing apparatus, an amplifier is also employed to amplify the analog weight signal outputted from the load cell. This amplifier tends to exhibit a drift in its output signal with change in, for example, power source voltage and/or temperature. Once this drift occurs, a weighing error results and, therefore, the drift needs to be dealt with as one of the problems to be solved for the purpose of increasing the weighing accuracy.

One method of eliminating the drift is suggested in which a circuit path through which the analog weight signal outputted from the load cell is inputted to the amplifier is disconnected, and then the input terminals of the amplifiers are shortcircuitted with each other. This allows an analog-to-digital conversion of an offset voltage thereof to be effected thereby enabling the drift to be detected in reference to a change in time. However, the shortcircuitting of the input terminals of the amplifier tends to result in an abrupt change in input level of the $\Delta\Sigma$-type AD converter as compared with the usual case in which the analog weight signal is inputted to the amplifier. If at this time the cut-off frequency of the digital filter employed in the $\Delta\Sigma$-type AD converter for the purpose of increasing the weighing accuracy is lowered, a relatively long time is required before the output follows up. Accordingly, the length of time, during which an accurate output value indicative of the drift cannot be obtained tends to be prolonged significantly. Also, when the analog weight signal is inputted the second time, a comparably long time is required for the digital filter to restore to the level of the input. Consequently, the response of the digital filter is considerably lowered at the time of drift detection.

The present invention has been devised with due regard to the existing situations discussed above and has for its primary object to provide a weighing apparatus wherein an analog filter is incorporated in the $\Delta\Sigma$-type AD converter to make it possible to set the cut-off frequency of the digital filter at a high value. Thus, the weighing apparatus can exhibit not only a favorable response characteristic, that is, a high weighing speed, but also an increase in weighing accuracy even though the cut-off frequency of the analog filter is set at a low value.

Another object of the present invention is to provide the weighing apparatus of a drift-compensated type wherein not only is a rectification of an error in the weight signal carried out in correspondence with the amount of drift of the amplifier thereby to increase the weighing accuracy, but the detection of the drift is quickly accomplished thereby minimizing the lowering of the weighing speed which would otherwise result from the drift correction.

Other objects and features of the present invention will become clear from the following description of the preferred embodiments of the present invention.

DISCLOSURE OF THE INVENTION

In order to accomplish the first described object of the present invention, the weighing apparatus according to the present invention comprises a weight detector for detecting the weight of the load to be weighed and outputting an analog weight signal, an amplifier for amplifying the analog weight signal, an analog filter for reducing a high frequency component of the amplified analog weight signal which is higher than a first cut-off frequency. The weighing apparatus also comprises a delta-sigma-type analog-to-digital converter including a modulator for modulating the analog weight signal, outputted from the analog filter, into a digital signal, and a digital filter for reducing a high frequency component of the digital signal which is higher than a second cut-off frequency which is in turn higher than the first cut-off frequency, thereby to provide the digital weight signal.

With this construction, since the second cut-off frequency of the digital filter employed in the delta-sigma-type analog-to-digital converter is chosen to be of a high value, the settling time of the delta-sigma-type analog-to-digital converter can be shortened to increase the response characteristic, that is, the weighing speed, during the weighing operation. At the same time, since the first cut-off frequency of the analog filter is chosen to be of a low value, the noise component contained in the analog weight signal can effectively be reduced to increase the weighing accuracy.

Also, in order to accomplish the second described object of the present invention, the weighing apparatus of the present invention has a capability of correcting a drift. This weighing apparatus further comprises a first switching means for switching over between a first connection, in which the analog weight signal is fed to the amplifier, and a second connection in which input terminals of the amplifier are shortcircuitted with each other, a second switching means for switching over between a first connection, in which the analog filter performs a filtering function, and a second connection in which the analog filter performs a buffering function, a mode selecting means for switching each of the first and second switching means over to the first connection during a weighing mode and for switching each of the first and second switching means over to the second connection during a correction mode, and a correcting means for storing the digital signal from the delta-sigma-type analog-to-digital converter as a drift signal during the correction mode and for providing a corrected digital weight signal by subtracting the drift signal from the digital weight signal obtained from the delta-sigma-type analog-to-digital converter during the weighing mode.

A preferred form of the analog filter referred to above includes a negative feed-back amplifier and an integrator circuit connected with a positive input terminal of the negative feed-back amplifier.

According to the above described construction, during the correction mode, the input terminals of the amplifier are shortcircuitted with each other and, at the same time, the analog filter is switched onto the second connection so as to perform the buffering function, enabling the digital signal, outputted from the delta-sigma-type analog-to-digital converter, to be stored as a drift signal. Accordingly, since the analog filter does not perform a filtering operation, the drift detection can quickly take place thereby to minimize any possible reduction in weighing speed which would otherwise occur as a result of the drift correction.

On the other hand, during the weighing mode, the analog weight signal is inputted to the amplifier and, at the same time, the analog filter is switched onto the first connection so as to perform the filtering function, thereby to obtain the digital weight signal from the delta-sigma-type analog-to-digital converter so that the drift signal stored during the correction mode is subtracted from the digital weight signal to provide a corrected digital weight signal. In this way, during the ordinary weighing mode, the noise component can be sufficiently suppressed by the function of the analog filter thereby to increase the weighing accuracy and, also, since the drift correction of the digital weight signal takes place, the weighing accuracy can be further increased.

In the weighing apparatus according to a preferred embodiment of the present invention, a plurality of digital weighing means each including the weight detector, the amplifier, the analog filter and the delta-sigma-type analog-to-digital converter are employed in the weighing apparatus. In combination therewith, the weighing apparatus further comprises a conversion control means for causing the delta-sigma-type analog-to-digital converters of the respective plural digital weighing means to perform conversion at a synchronized timing, and a combination arithmetic means for performing a combining calculation of the respective digital weight signals from the plural digital weighing means and for selecting the weighing means which are generating the digital weight signal of a combination equal to or close to a target value.

With the construction described above, a combination weighing apparatus excellent in both weighing accuracy and weighing speed can be obtained. Specifically, since the timing at which the delta-sigma-type analog-to-digital converters operate to convert the analog signals into the respective digital signals remains the same, the digital weight signals from the respective weighing means at the same timings can be fed and, therefore, any possible weighing error resulting from, for example, a floor vibration can be accurately compensated for, resulting in an increase in weighing accuracy.

According to another preferred embodiment of the present invention, the weighing apparatus utilizes the single delta-sigma-type analog-to-digital converter common to all of the analog weighing means. For this purpose, a plurality of analog weighing means each including the weight detector, the amplifier and the analog filter are employed and the single delta-sigma-type analog-to-digital converter is connected in common with the plural analog weighing means. This weighing apparatus further comprises a change-over means for supplying the analog weight signals from the plural analog weighing means selectively to the delta-sigma-type analog-to-digital converter, and a combination arithmetic means for performing a combining calculation of the respective digital weight signals, outputted from the delta-sigma-type analog-to-digital converter in correspondence with the analog signals from the plural weighing means, and for selecting the weighing means which are generating the digital weight signals of a combination equal to or close to a target value.

In the weighing apparatus wherein the single delta-sigma-type analog-to-digital converter is connected in common with the plural analog weighing means, since the delta-sigma-type analog-to-digital converter has the high second cut-off frequency and is excellent in response characteristic, connection of the plural analog weighing means each provided with the analog filter having a low response characteristic with the delta-sigma-type analog-to-digital converter through a switching means such as, for example, a multiplexer makes it possible to simplify the structure using the single delta-sigma-type analog-to-digital converter and without the response of the apparatus as a whole being lowered.

At the time of switching of the analog weight signals by means of the switching means, any possible measurement error resulting from a phase displacement of the signals can be sufficiently suppressed. In other words, since the cut-off frequency of the digital filter employed in the delta-sigma-type analog-to-digital converter is chosen to be of a high value, the settling time corresponding to the delay in outputting can be sufficiently shortened. Accordingly, the switching frequency at which the plural analog weight signals are selectively supplied to the delta-sigma-type analog-to-digital converter through the switching means increases substantially. Since the delta-sigma-type analog-to-digital converter performs the voltage-to-frequency conversion using the analog weight signal as a continuous quantity, the presence of a high frequency noise component in the analog weight signals would result in a phase displacement among the analog weight signals occurring at the time of switching. However, with the foregoing construction, the analog filters connected with the front stage of the switching means and having the low cut-off frequency are effective to suppress the high frequency noise component sufficiently and the frequency of the noise component is therefore lowered. Accordingly, even the switching at the high frequency referred to above would not result in any phase displacement among the weight signals. Consequently, a relatively high weighing accuracy can be maintained.

Also, according to a further preferred embodiment of the present invention, the weighing apparatus is of a so-called multi-point cell design can be obtained to determine the weight of the load to be weighed by summing values measured by a plurality of weight detectors (load-cells). In this weighing apparatus of the multi-point cell design, instead of the use of the combination arithmetic means employed in the above described combination weighing apparatus, an adder means is employed for summing signals from the plural weighing means to provide an indication of the weight of the load to be weighed.

According to a further preferred embodiment of the present invention, the weighing apparatus is of a version corresponding to any one of the combination weighing apparatus and the weighing apparatus of the multi-point cell design incorporated with the drift correcting function. For this purpose, each of the plural weighing means is provided with the first and second switching means referred to above in combination with the mode selecting means and the correcting means both referred to above.

BEST MODE FOR CARRYING OUT THE INVENTION

Hereinafter, preferred embodiments of the present invention will be discussed in detail with reference to the accompanying drawings.

[First Embodiment (Single Cell Model)]

Figure 1:
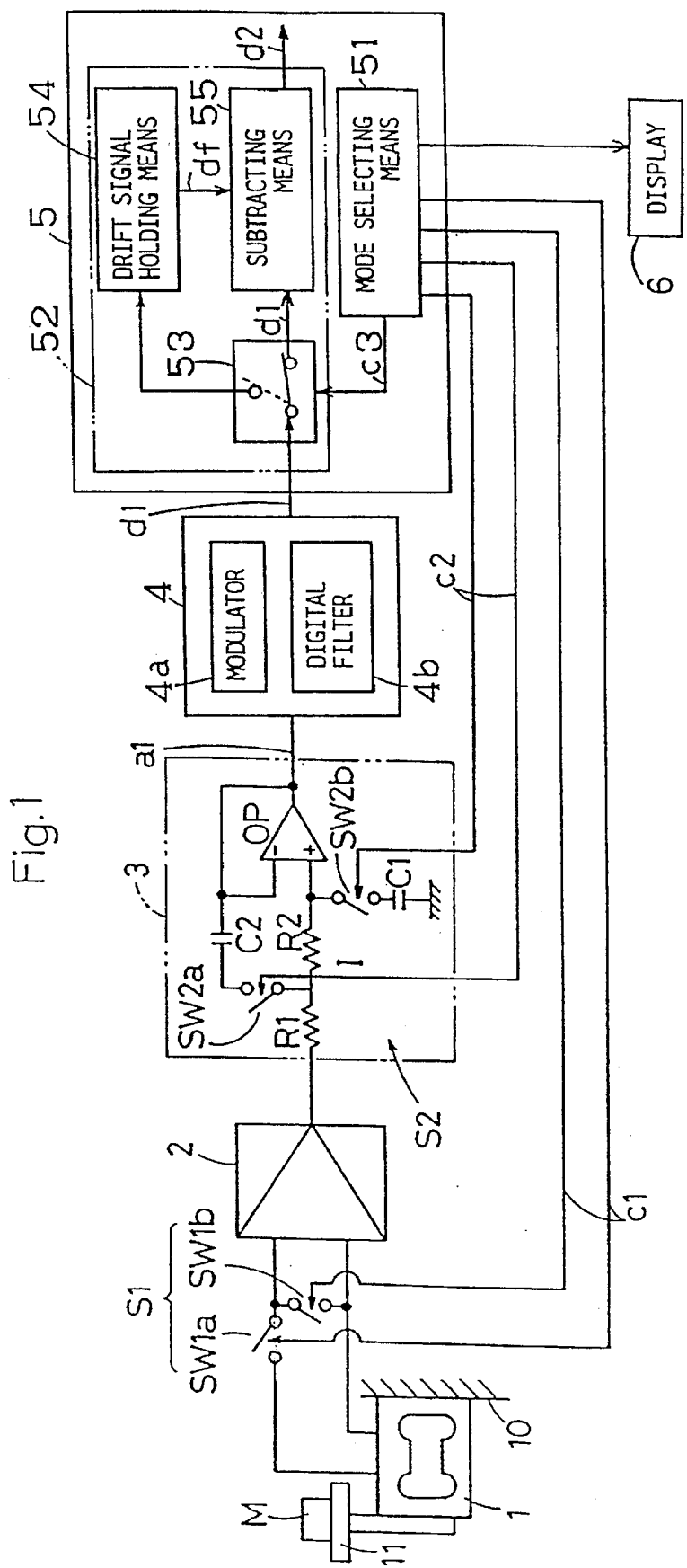
FIG. 1 is a circuit diagram showing a weighing apparatus according to a first preferred embodiment of the present invention.

FIG. 1 is a block circuit diagram showing the structure of the weighing apparatus according to the first preferred embodiment of the present invention. In this figure, the weighing apparatus incudes a load cell 1, which is an example of a weight detector, and this load cell 1 detects the weight of a load M to be weighed and then outputs an analog electric weight signal. The load cell 1 is supported at one end by a bench 10 and is mounted at the opposite end thereof with a weighing table 11 on which the load M to be weighed is placed. This load cell 1 includes a strain detecting element, such as a strain gauge, operable to detect the magnitude of strain induced in the load cell 1 in proportion to the load placed on the weighing table 11 and generates the analog weight signal referred to above. The load on the weighing table 11 on which the load M to be weighed is placed is measured by a single load cell 1 and, therefore, the illustrated weighing apparatus is a so-called single cell model.

Reference numeral 2 represents a differential amplifier circuit operable to amplify the analog weight signal outputted from the load cell 1. Reference numeral 3 represents an analog filter operable to reduce a high frequency component of the analog weight signal, amplified by the differential amplifier circuit 2, which is higher than a first cut-off frequency, that is, a vibration component resulting mainly from mechanical vibration of the load cell 1. This analog filter 3 is designed to have a low cut-off frequency which is, for example, within the range of 3 to 7 Hz.

Reference numeral 4 represents a $\Delta\Sigma$-type AD converter including a modulator 4a for modulating the analog weight signal from the analog filter 3 into a digital signal, and a digital filter 4b operable to reduce a high frequency component of the digital signal which is higher than a second cut-off frequency which is in turn higher than the first cut-off frequency referred to above. The second cut-off frequency of the digital filter 4b is chosen to be within the range of, for example, 20 to 100 Hz. Reference numeral 5 represents a central processing unit (CPU) adapted to receive a digital weight signal d1 outputted from the $\Delta\Sigma$-type AD converter 4, said central processing unit 5 being so programmed as to perform a calculation of the level of any one of the digital weight signal d1 and a drift signal df as will be described later, a span adjustment for accommodating the value thereof within a predetermined range, and an operation to cause a display unit 6 to provide an indication of the weight measured. This central processing unit 5 also includes a mode selecting means 51 and a correcting means 52 for giving a corrected digital weight signal d2, both of which will be described later.

A first switching means S1 is interposed between the load cell 1 and the differential amplifier circuit 2 and includes a normally closed switch SW1a and a normally open switch SW1b for selectively accomplishing a first connection, in which the analog weight signal is fed from the load cell 1 to the differential amplifier circuit 2, and a second connection in which input terminals of the differential amplifier circuit 2 are shortcircuitted with each other. In other words, the first switching means S1 is so designed as to selectively establish one of an ordinary weighing mode during the first connection in which the switches SW1a and SW1b are switched on and off, respectively, in response to control signals c1 applied from the mode selecting means 51 of the central processing unit 5, and a correction mode during the second connection in which the switches SW1a and SW1b are switched off and on, respectively.

The analog filter 3 referred to above includes a buffer amplifier OP in the form of a negative feed-back amplifier circuit, an RC integrator circuit I connected with a positive input terminal of the buffer amplifier OP and comprised of two series-connected input resistors R1 and R2 and a capacitor C1, and a capacitor C2 interposed between a negative feed-back terminal of the buffer amplifier OP and the junction between the series-connected resistors R1 and R2. A normally closed switch SW2a is interposed between the junction of the series-connected resistors R1 and R2 and the capacitor C2, and a normally closed switch SW2b is interposed between the positive input terminal of the buffer amplifier OP and the capacitor C1 of the RC integrator circuit I.

A second switching means 82 constituted by the normally closed switches SW2a and SW2b is controlled by control signals c2 supplied from the mode selecting means 51 of the central processing unit 5 so that the second switching means S2 can be selectively switched between an ordinary weighing mode, in which a filtering function can be utilized, during a first connection in which both of the normally closed switches SW2a and SW2b are switched off, and a correction mode, in which a buffering function with no delay in response can be utilized, during a second connection in which both of the normally closed switches SW2a and SW2b are switched off.

The correcting means 52 of the central processing unit 5 includes a change-over switch 53, a drift signal holding means 54 and a subtracting means 55 and is operable to switch the change-over switch 53 in response to a control signal c3 outputted from the mode selecting means 51 in dependence on one of the correction mode and the weighing mode, so that, during the correction mode, the digital signal outputted from the $\Delta\Sigma$-type AD converter 4 can be inputted to the drift signal holding means 54, but during the ordinary weighing mode, a digital weight signal d1 outputted from the $\Delta\Sigma$-type AD converter 4 can be inputted to the subtracting means 55.

The operation of the foregoing first preferred embodiment of the present invention will now be described.

According to the construction described hereinabove, since the second out-off frequency of the digital filter 4b built in the $\Delta\Sigma$-type AD converter 4 is chosen to be of a high value, it is possible to shorten the settling time thereby to increase the response characteristic of the weighing apparatus as a whole, that is, to increase the weighing speed. At the same time, since the first out-off frequency of the analog filter 3 is chosen to be of a low value, it is possible to effectively reduce a noise component contained in the analog weight signal thereby to increase the weighing accuracy.

In the first place, during the ordinary weighing mode, the first and second switching means S1 and S2 are brought in the first connection in response to the control signals c1 and c2 fed from the mode selecting means 51 of the central processing unit 5. During this first connection, the switches SW1a and SW1b of the first switching means S1 are switched on and off, respectively, permitting the analog weight signal to be fed to the differential amplifier circuit 2, while the switches SW2a and SW2b of the second switching means S2 are both switched on, permitting the analog filter 3 to exhibit its filtering function. Also, in response to the control signal c3 from the mode selecting means 51, the change-over switch 53 in the central processing unit 5 assumes a first connection as shown by the solid line, permitting the digital weight signal d1 to be fed from the $\Delta\Sigma$-type AD converter 4 to the subtracting means 55.

During such weighing mode, the analog filter 3 having the low cut-off frequency reduces a high frequency component contained in the analog weight signal amplified by the differential amplifier circuit 2, thereby to increase the weighing accuracy. The analog weight signal a1 having passed through the analog filter 3 is inputted to the $\Delta\Sigma$-type AD converter 4 and is then modulated by the modulator 4a in the $\Delta\Sigma$-type AD converter 4 into a digital signal, a high frequency component of the digital signal is subsequently filtered in high response by the digital filter 4b having the high cut-off frequency, thereby reducing the settling time of the $\Delta\Sigma$-type AD converter 4. The digital weight signal d1 of which high frequency component has been reduced is supplied through the central processing unit 5 to the display unit 6 thereby providing a visual indication of the weight represented by the digital weight signal d1.

Thus, by the combination of the analog filter 3 having the first cut-off frequency of a relatively low value with the $\Delta\Sigma$-type AD converter 4 connected therewith at the following stage and having the second cut-off frequency of a relatively high value, not only can the weighing accuracy be increased, but the response characteristic, that is, the weighing speed, during a weighing operation can also be increased.

On the other hand, during the correction mode, the first and second switching means S1 and S2 are brought in the second connection in response to the control signals c1 and c2 fed from the mode selecting means 51 of the central processing unit 5. During this second connection, the switches SW1a and SW1b of the first switching means S1 are switched off and on, respectively, permitting the input terminals of the differential amplifier circuit 2 to be short-circuitted with each other without the analog weight signal from the load cell 1 being supplied to the differential amplifier circuit 2, while the switches SW2a and SW2b of the second switching means S2 are both switched off, permitting the analog filter 3 to cause the buffer amplifier OP to exhibit its buffering function. It is to be noted that, since the buffer amplifier OP is constituted by the negative feedback amplifier, it can exhibit the buffering function stably.

Also, in response to the control signal c3 from the mode selecting means 51, the change-over switch 53 in the central processing unit 5 assumes a second connection as shown by the phantom line, permitting the digital weight signal d1 to be fed from the $\Delta\Sigma$-type AD converter 4 to the drift signal holding means 54.

During such correction mode, a reference level signal used to detect the amount of offset is inputted to the differential amplifier circuit 2, an output signal therefrom is inputted to the analog filter 3 then switched to exhibit the buffering function and is subsequently inputted to the $\Delta\Sigma$-type AD converter 4 with no delay in response for conversion into a digital signal. Accordingly, the length of time required to accomplish the detection of the drift can be shortened.

Thereafter, the digital signal referred to above is inputted as a drift signal df to the central processing unit 5 and is subsequently held in the drift signal holding means 54 through the change-over switch 53. In the event that the weighing mode is selected as hereinbefore described, the digital weight signal d1 outputted from the $\Delta\Sigma$-type AD converter 4 is inputted to the subtracting means 55 through the change-over switch 53. The subtracting means 55 then operates to subtract the drift signal df, stored in the drift signal holding means 54 in the manner described above, from the digital weight signal dl thereby to provide a corrected digital weight signal d2.

As hereinbefore described, since the drift detection is quickly performed during the correction mode, the weighing speed increases.

It is to be noted that the drift correction employed in the practice of the first preferred embodiment of the present invention can be dispensed with, in which case the first switching means S1, the second switching means S2 and both of the mode selecting means 51 and the correcting means 52 in the central processing unit 5 need not be employed. Even though no drift correction is effected, the combined use of the $\Delta\Sigma$-type AD converter 4 with the analog filter 3 disposed at the front stage thereof can bring about an effect of increasing the weighing speed and the weighing accuracy.

It is also to be noted that the use may be made of a plurality of analog filters 3 connected in series, in which case both of the filtering effect and the response characteristic can be increased.

[Second Embodiment (Combination Design)]

Figure 2:
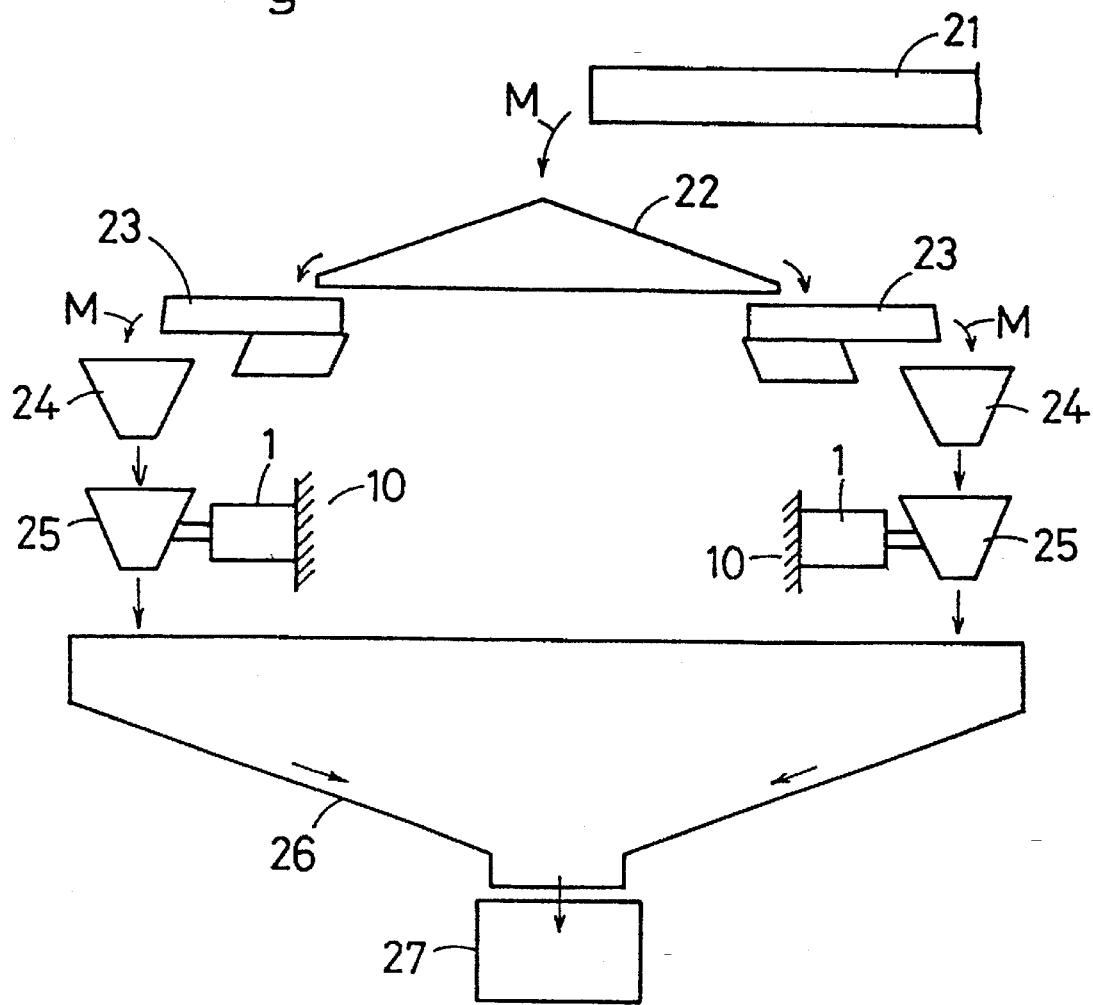
FIG. 2 is a schematic side view showing the entire structure of the weighing apparatus according to a second preferred embodiment of the present invention.

FIG. 2 illustrates a schematic structure of a combination weighing apparatus to which the present invention is applicable. In this figure, a generally conical dispensing feeder 22 is disposed below a transport conveyor 21 positioned at top thereof. The transport conveyor 21 receives loads M to be weighed such as, for example, candies, fishes or any other material and then transport hem to a position immediately above the dispensing feeder 22 so that the load M can fall by gravity towards an apex portion of the dispensing feeder 22.

A plurality of vibratory feeders 23 are circumferentially disposed in the vicinity of an outer perimeter of the dispensing feeder 22. Each of these vibratory feeders 23 is of a type capable of delivering the loads M radially outwardly while undergoing vibration and then discharge them into weighing hoppers 25, equal in number to the number of the vibratory feeders 23, through respective pool hoppers 24. A single load cell 1 is employed for each weighing hopper 25 and is secured at one end to a support bench 10, the opposite end of said load cell 1 carrying the respective weighing hopper 25. Each load cell 1 detects the weight of the load M within the associated weighing hopper 25 and outputs an analog weight signal indicative of the weight detected. Positioned beneath the weighing hoppers 25 is a collecting and discharge chute 26 which is communicated with a packaging machine 27 positioned below said collecting and discharge chute 26.

Figure 3:
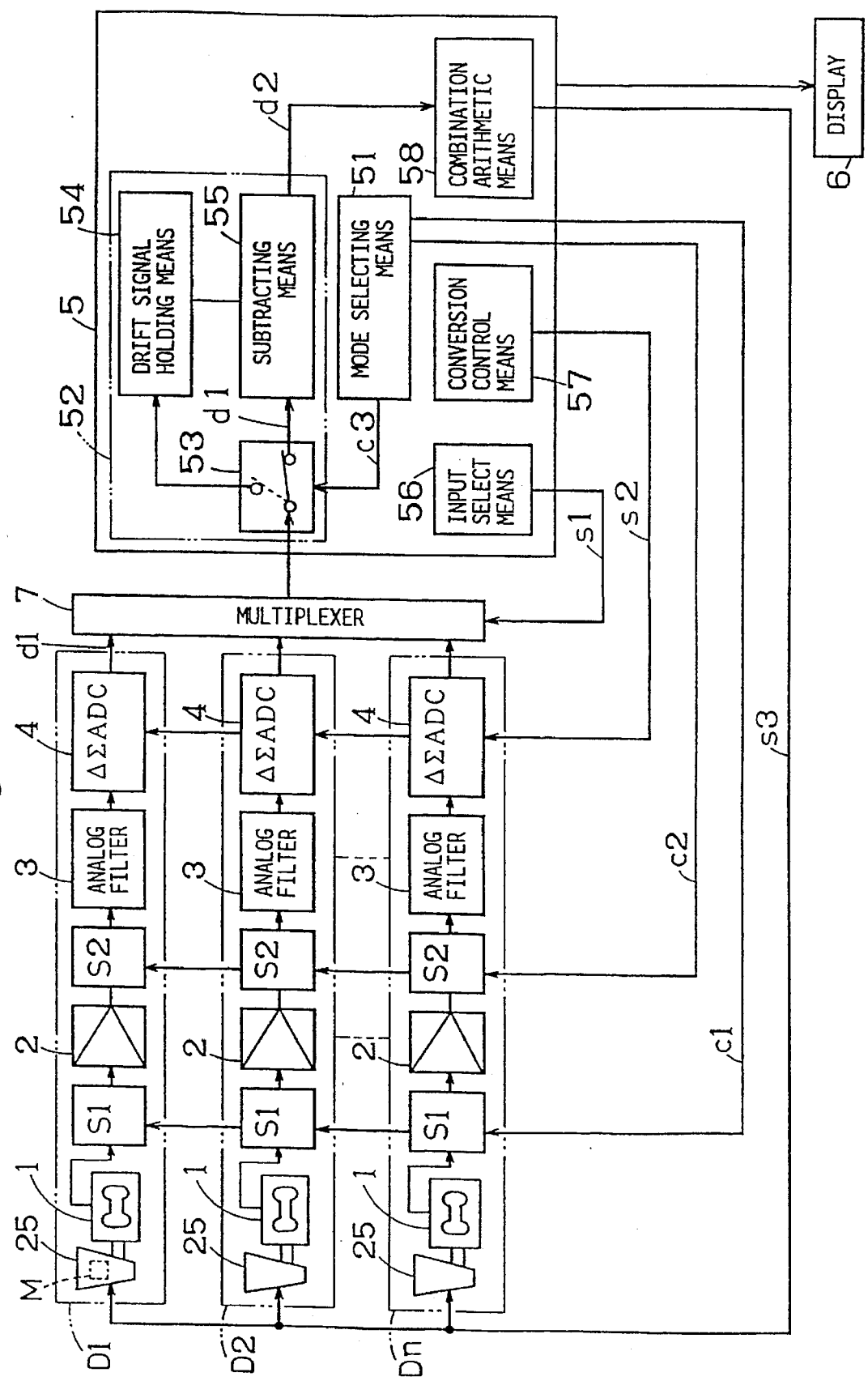
FIG. 3 is a circuit diagram showing a signal processing circuit employed in the weighing apparatus according to the second preferred embodiment of the present invention.

FIG. 3 illustrates a signal processing circuit for processing the analog weight signal outputted from each of the load cells 1. In this figure, reference character D1, D2, ... and Dn represent digital weighing means equal in number to the number of the load cells 1, each of said weighing means D1, D2, ... and Dn including the associated load cell 1, the differential amplifier circuit 2, the analog filter 3 having the first cut-off frequency, the first and second switching means S1 and 82 and the $\Delta\Sigma$-type AD converter 4. As a switching means for selectively inputting the digital weight signals d1 from the respective weighing means D1, D2, ... and Dn to the central processing unit 5, a multiplexer 7 is connected with the weighing means D1, D2, ... and Dn.

The central processing unit 5 includes, in addition to the mode selecting means 51 and the correcting means 52, an input select means 56 capable of generating an input select signal s1 for selecting one of the digital weight signals d1 to be inputted from the weighing means D1, D2, ... and Dn to the central processing unit 5, a conversion control means 57 for controlling the conversion which takes place in the $\Delta\Sigma$-type AD converter 4, and a combination arithmetic means 58. The conversion control means 57 generates a conversion control signal s2 at intervals of, for example, a predetermined cycle so that the $\Delta\Sigma$-type AD converter 4 in the digital weighing means D1, D2, ... and Dn can perform the respective conversion at a synchronized timing. The combination arithmetic means 58 referred to above is operable to perform a combining calculation of corrected digital weight signals d2, i.e., the digital weight signals d1 of the digital weighing means D1, D2, ... and Dn from which respective drift components have been removed, thereby to provide a weighing means selection signal s3 for selecting the weighing means which are then generating the digital weight signal d1 of a combination equal to or close to a target value.

In the above described construction, by supplying the input select signal s1 from the input select means 56 of the central processing unit 5 to the multiplexer 7, the digital weight signals d1 outputted from the respective weighing means D1, D2, ... and Dn are selectively inputted to the central processing unit 5 in a predetermined sequence. In the central processing unit 5, the correcting means 52 performs a drift correction to the respective digital weight signals d1 from the weighing means D1, D2, ... and Dn thereby to provide the corrected weight signal d2. The combination arithmetic means 58 performs the combining calculation to the corrected digital weight signals d2, that is, the digital weight signals d1 outputted from the respective weighing means D1, D2, ... and Dn and subsequently drift-corrected by the correcting means 52, and then outputs the weighing means selection signal s3 used to select the weighing means of a combination equal to or close to the target value so that the weighing hopper 25 associated with the selected weighing means can be opened to discharge the load M, accommodated in such weighing hopper 25, onto the collecting and discharge chute 26 shown in FIG. 2. The load M so discharged is thereafter packaged by the packaging machine 27.

According to the second preferred embodiment of the present invention, as is the case with the foregoing first preferred embodiment of the present invention, the combined use of the analog filter 3 and the $\Delta\Sigma$-type AD converter 4 in each of the weighing means D1, D2, ... and Dn is effective to provide the combination weighing apparatus excellent in both of the weighing accuracy and the weighing speed. Also, since the $\Delta\Sigma$-type AD converters 4 operate at the same conversion timing in response to the conversion control signal s2 supplied from the conversion control means 57 to receive the digital weight signals d1 given at the same weighing timing, a weighing error resulting from a floor vibration can be accurately compensated for thereby increasing the weighing accuracy. A method of correcting the weighing error resulting from the floor vibration is disclosed in, for example, the Japanese Laid-open Patent Publication No. 3-233327 published Oct. 17, 1991.

In addition, as is the case with the first preferred embodiment of the present invention described above, if the analog filter 3 is switched to exhibit the buffering function and the drift correction is then performed, not only can the weighing accuracy be further increased, but also the reduction in weighing speed can be suppressed considerably.

It is to be noted that, even in the second preferred embodiment of the present invention, the drift correction may be dispensed with. In such case, the first and second switching means S1 and S2 need not be employed and, therefore, each of the digital weighing means D1, D2, ... and Dn is made up with the load cell 1, the differential amplifier circuit 2, the analog filter 3 and the $\Delta\Sigma$-type AD converter 4. Also, the mode selecting means 51 and the correcting means 52 both employed in the central processing unit 5 are unnecessary, allowing the digital weight signal d1 emerging from each of the digital weighing means D1, D2, ... and Dn to be directly inputted to the combination arithmetic means 58 to accomplish the combining calculation.

It is to be noted that, instead of the use of the multiplexer 7, the correcting means 51 may be employed for each of the weighing means D1, D2, ... and Dn so that the respective digital weight signals d1 can be supplied from the weighing means D1, D2, ... and Dn to the plural correcting means 52 in response to a control signal from the central processing unit 5.

[Third Embodiment (Single $\Delta\Sigma$-type AD Converter in Combination Design)]

Figure 4:
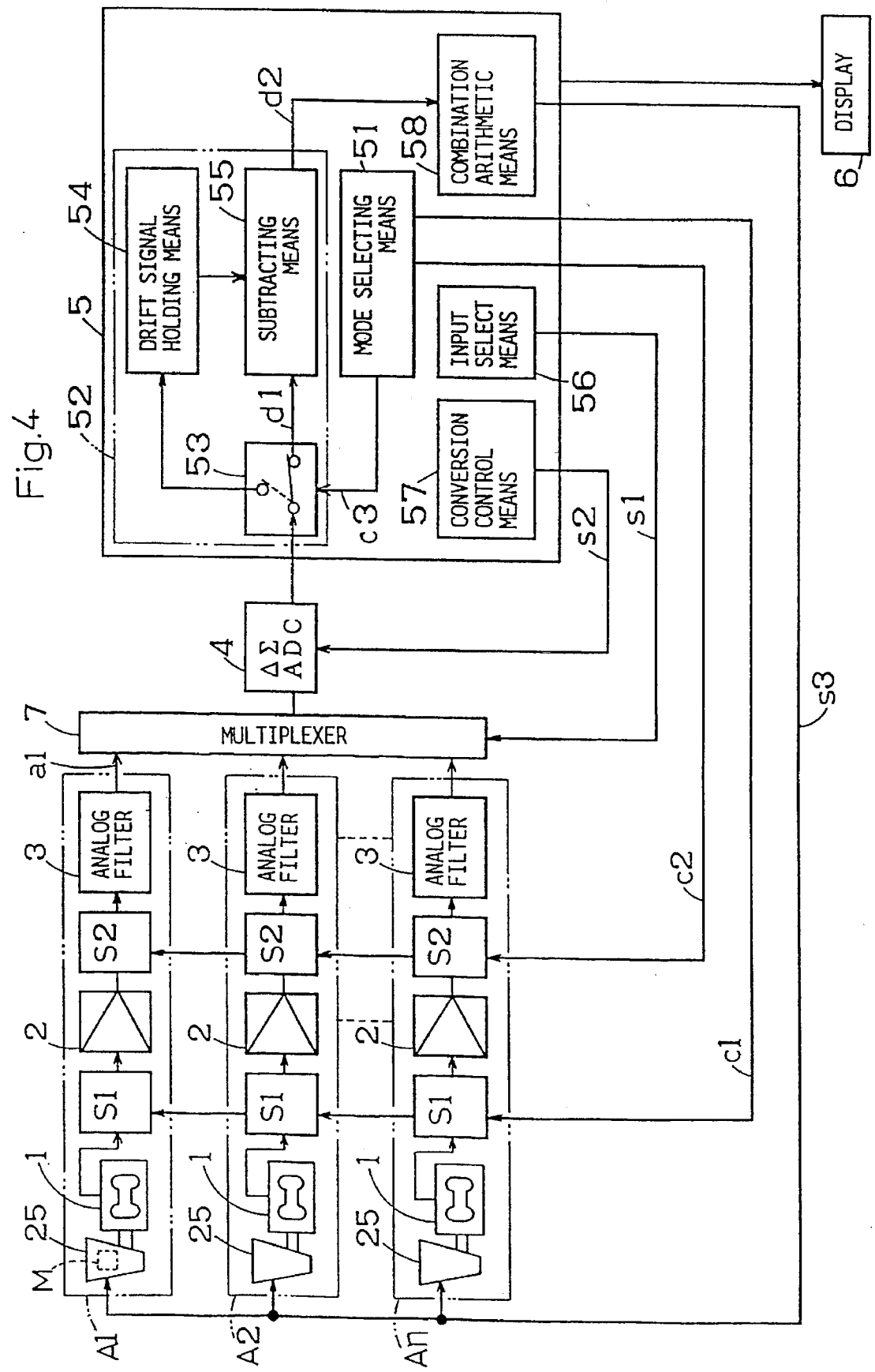
FIG. 4 is a circuit diagram showing the weighing apparatus according to a third preferred embodiment of the present invention.

The third preferred embodiment of the present invention is a version in which a single $\Delta\Sigma$-type AD converter is employed in the combination weighing apparatus of the second preferred embodiment of the present invention. Referring now to FIG. 4, each of a plurality of analog weighing means A1, A2, ... and An includes the load cell 1, the differential amplifier circuit 2, the analog filter 3 having the first cut-off frequency, and the first and second switching means S1 and S2. As a switching means for selectively inputting the analog weight signals a1 from the respective weighing means A1, A2, ... and An to the $\Delta\Sigma$-type AD converter 4, the multiplexer 7 is employed.

In this third preferred embodiment of the present invention, when the input select signal s1 from the input select means 56 of the central processing unit 5 is inputted to the multiplexer 7, the analog weight signals a1 outputted from the respective weighing means A1, A2, ... and An are selectively inputted to the $\Delta\Sigma$-type AD converter 4 in a predetermined sequence and are successively converted into the digital weight signals d1. Each digital weight signal d1 is subsequently supplied to the central processing unit 5, followed by a drift correction by the correcting means 52 thereby to provide the corrected digital weight signal d2. Thereafter, the combination arithmetic means 58 performs the combining calculation to the corrected digital weight signals d2, that is, the analog weight signals a1 outputted from the respective weighing means A1, A2, ... and An and subsequently drift-corrected by the correcting means 52.

In this third preferred embodiment of the present invention, since the only single $\Delta\Sigma$-type AD converter 4 is employed, the circuit structure can be advantageously simplified. Also, since the analog filter 3 employed in each of the weighing means A1, A2, ... and An has the relatively low cut-off frequency, the weighing accuracy can be increased as is the case with the second preferred embodiment of the present invention.

Again, since the $\Delta\Sigma$-type AD converter 4 has the relatively high cut-off frequency, the response is high and, therefore, even though the single $\Delta\Sigma$-type AD converter 4 is employed together with the plural weighing means A1, A2, ... and An, any possible reduction in response, that is, any possible reduction in weighing speed, of the apparatus as a whole can be suppressed. By way of example, assuming that the number of the weighing means A1, A2, ... and An employed is ten and that the settling time (a delay in outputting) of the analog filter 3 in each of the weighing means A1, A2, ... and A10 is 200 msec. and the settling time of the $\Delta\Sigma$-type AD converter 4 is 10 msec., the response time of the weighing apparatus as a whole which employs the 10 $\Delta\Sigma$-type AD converter 4 such as in the second preferred embodiment of the present invention would amount to a simple sum of 210 msec. In contrast thereto, in the third preferred embodiment of the present invention in which the single $\Delta\Sigma$-type AD converter 4 is employed, the response time of the weighing apparatus as a whole would amount to 300 msec. which is the sum of the settling time of the analog filter 3 (200 msec.) plus the settling time of the $\Delta\Sigma$-type AD converter 4 (10 msec.) multiplied by 10, that is $\{200+(10\times 10)\}$. In other words, in the third preferred embodiment of the present invention, even though the number of the $\Delta\Sigma$-type AD converter 4 is one tenth, the response time can be suppressed to a value equal to 1.43 (=300/210) of that of the apparatus using the 10 $\Delta\Sigma$-type AD converters 4.

Furthermore, in the third preferred embodiment of the present invention, since the drift correction is carried out by the same means as in the first preferred embodiment of the present invention, not only can the weighing accuracy be increased, but also the length of time required to accomplish the drift detection can be reduced.

Any possible weighing error which would result from a phase displacement of the signal can be sufficiently suppressed at the time of switching of the analog weight signals by the switching means 7. In other words, since the second cut-off frequency of the digital filter 4b employed in the $\Delta\Sigma$-type AD converter 4 is chosen to be of a high value, the settling time corresponding to the delay in outputting is short of, for example, about 10 msec. Accordingly, the switching frequency at which the analog weight signals a1 from the respective weighing means A1, A2, ... and An are selectively inputted to the $\Delta\Sigma$-type AD converter 4 common to all of these weighing means A1, A2, ... and An is about 100$\{1/(10$ msec.$)\}$ Hz. Since the $\Delta\Sigma$-type AD converter 4 performs the voltage-to-frequency conversion using the analog weight signal a1 as a continuous quantity, the presence of a high frequency noise component in the analog weight signals 3 would result in a phase displacement among the analog weight signals a1 occurring at the time of switching. However, with the foregoing construction, the analog filters 3 connected with the front stage of the switching means 7 and having the low cut-off frequency are effective to suppress the high frequency noise component sufficiently down to, for example, about 5 Hz. Accordingly, even the switching at 100 Hz would not result in any phase displacement among the weight signals a1. Consequently, a relatively high weighing accuracy can be maintained.

It is to be noted that, assuming that a unit comprising the plural weighing means A1, A2, ... and An, the multiplexer 7 and the $\Delta\Sigma$-type AD converter 4 is used as a single weighing device, and if this weighing device is employed in a plural number and connected selectively with the central processing unit 5 through a switching means such as, for example, a different multiplexer, the number of the weighing means A1, A2, ... and An can be increased while any possible reduction in response characteristic is considerably suppressed and, at the same time, the structure is simplified. In other words, the freedom of the number of the load cells 1 that can be employed increases further without accompanying a reduction in performance of the weighing apparatus.

Even in the third preferred embodiment of the present invention, the drift correction may be dispensed with. In such case, each of the analog weighing means A1, A2, ... and An is constituted by the load cell 1, the differential amplifier circuit 2 and the analog filter 3. Also, the mode selecting means 51 and the correcting means 52 both employed in the central processing unit 5 are unnecessary, allowing the digital weight signal d1, outputted in response to the associated analog weight signal a1 from each of the analog weighing means A1, A2, ... and An, to be directly inputted to the combination arithmetic means 58 to accomplish the combining calculation.

[Fourth Embodiment (Multi-point Cell Design)]

Figure 5:
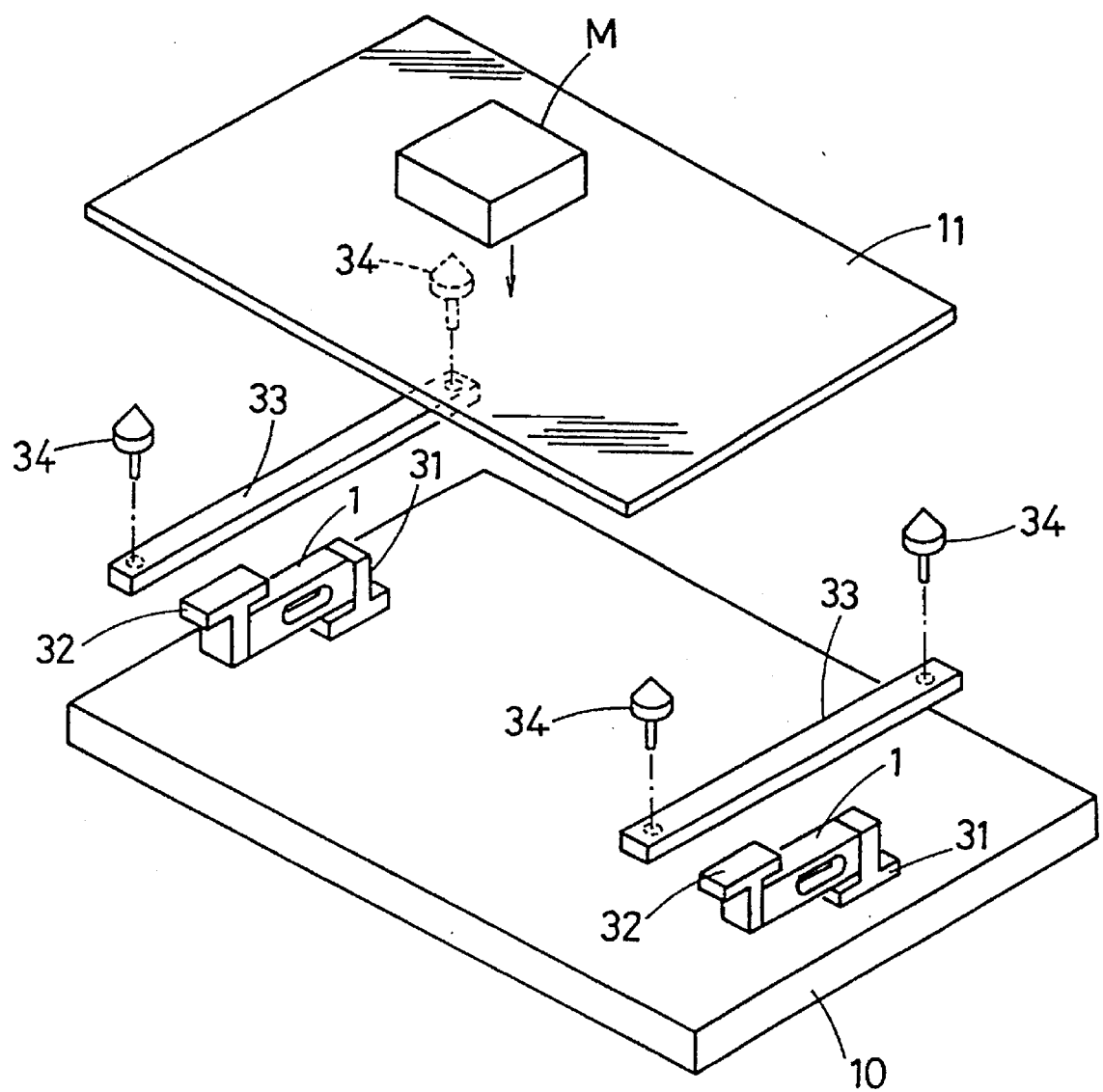
FIG. 5 is a schematic side view showing the entire structure of the weighing apparatus according to a fourth preferred embodiment of the present invention.

This fourth preferred embodiment of the present invention is the weighing apparatus of a so-called multi-point cell design in which, as shown in FIG. 5, a single weighing table 11 is supported by a plurality of, for example, two, load cells 1. Each of the load cells 1 has one end fixedly secured to a support bench 10 by means of a respective fixture 31 and also has the opposite end carrying a support fixture 32 on which a respective arm 33 having a pair of generally conical support pieces 34 mounted thereon is mounted. The weighing table 11 is mounted on the arms 33 by means of a four-point support system defined by respective apexes of the conical support pieces 34.

Figure 6:
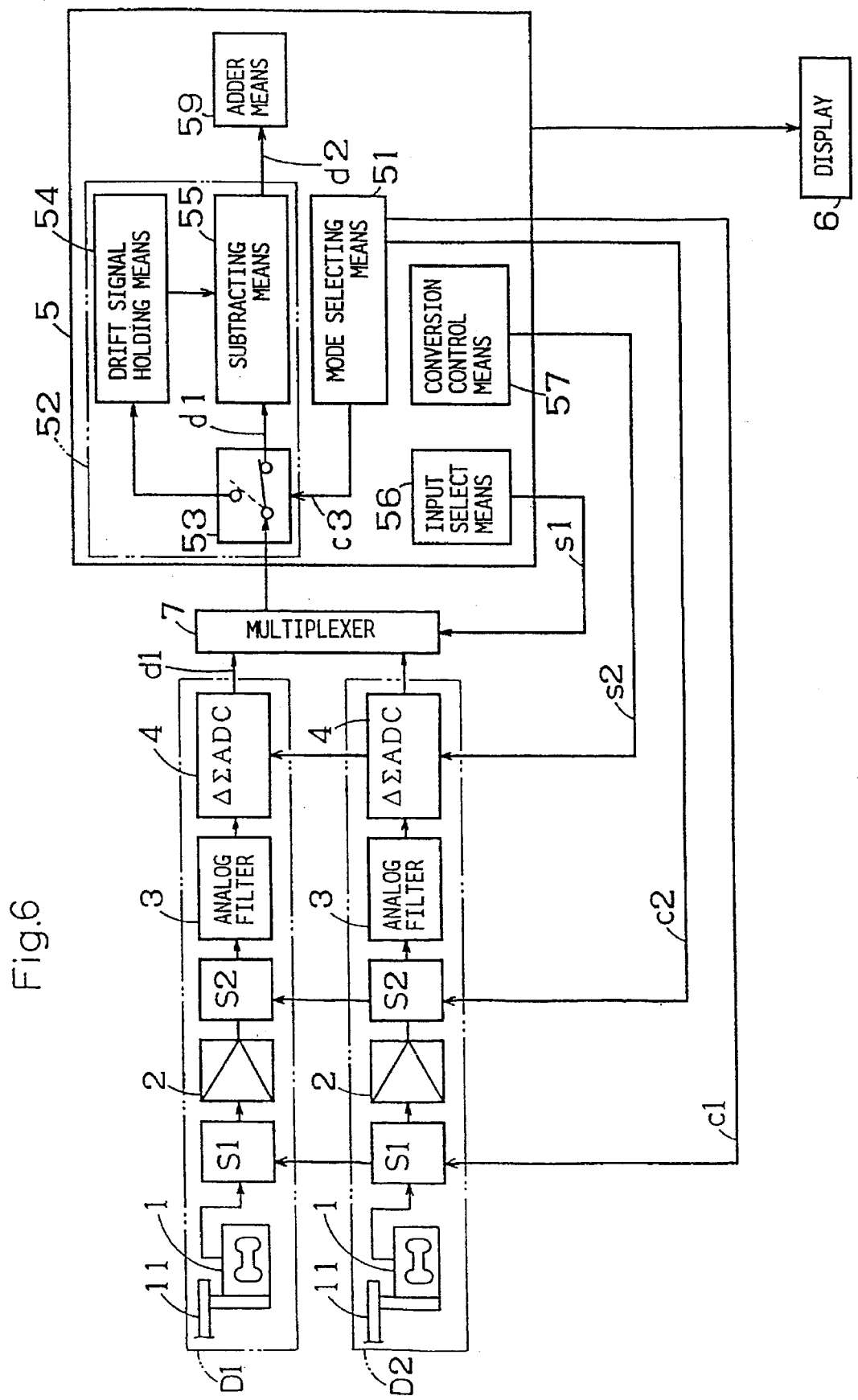
FIG. 6 is a circuit diagram showing a signal processing circuit employed in the weighing apparatus according to the fourth preferred embodiment of the present invention.
Figure 7:
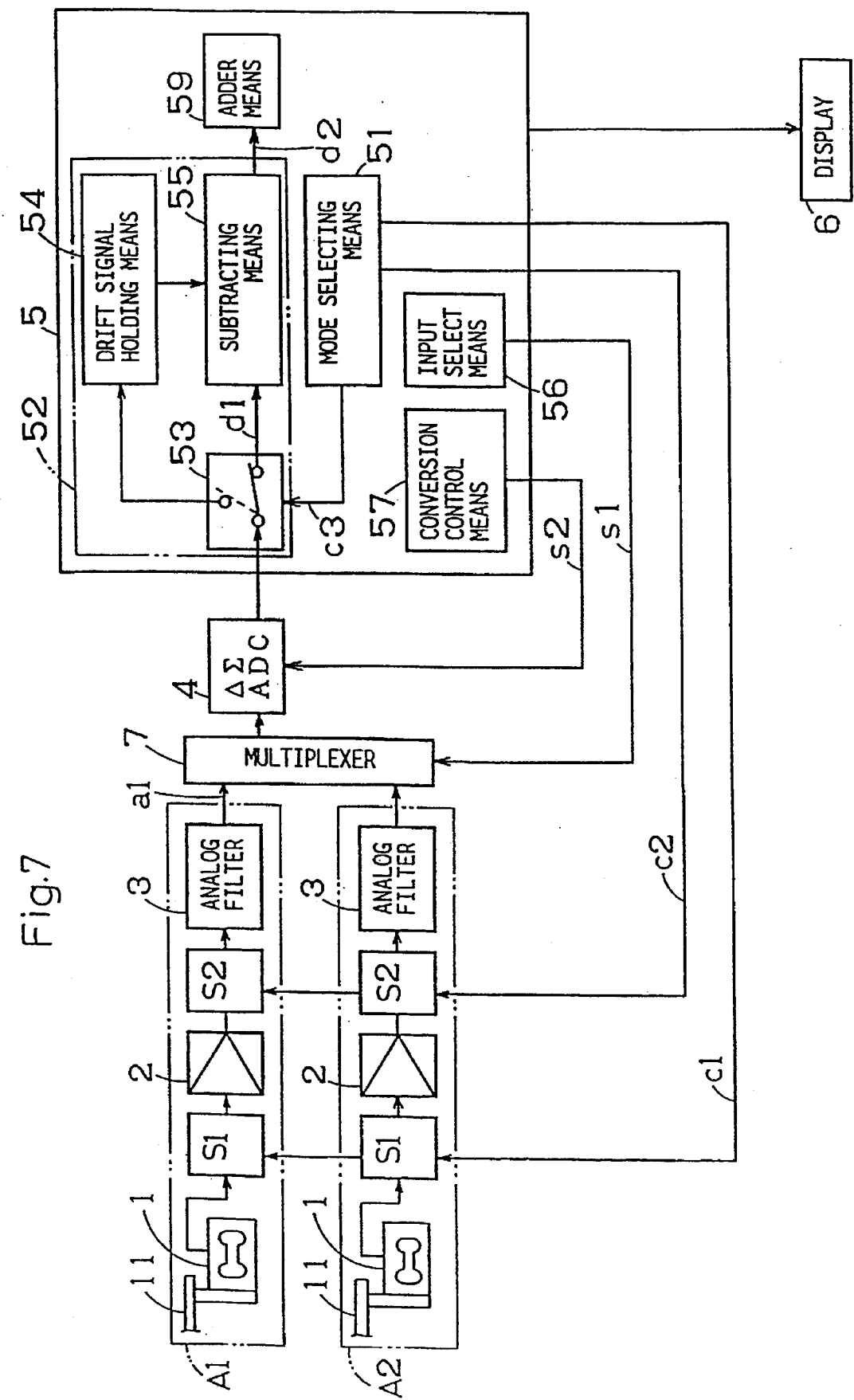
FIG. 7 is a circuit diagram showing the weighing apparatus according to a fifth preferred embodiment of the present invention.

A signal processing circuit employed in this weighing apparatus of the multi-point cell design is substantially similar to that shown in and described in connection with the third preferred embodiment of the present invention, but employs, as shown in FIG. 6, an adder means 59 in place of the combination arithmetic means 58 employed in the combination weighing apparatus shown in FIG. 3. Because of the employment of the adder means 59, the digital weight signal d1 from the respective digital weighing means D1 and D2 are summed together so that the weight of the load M to be weighed that is placed on the weighing table 11 can be measured.

Where the weighing table 11 is of, for example, a belt conveyor type and the weighing apparatus is of a type capable of measuring the weight of the load M to be weighed while the latter is transported over the weighing table 11 of the belt conveyor type, the load imposed on the load cells 1 forming respective parts of the digital weighing means D1 and D2 may vary with passage of time and, therefore, in order to accurately measure the weight of the load M to be weighed, it is preferred to sum the loads imposed on the load cells 1 together at the same timing. In contrast thereto, in the fourth preferred embodiment of the present invention, since the analog weight signals a1 which vary with passage of time are simultaneously converted into the respective digital weight signals d1 by the conversion control means 57 of the central processing unit 5, that is, since the digital weight signals d1 can be obtained in dependence on a signal fed in from the load cells 1 at the same timing, the summation of the digital weight signals d1 can provide an accurate measurement of the weight of the load M to be weighed. In other words, the weighing apparatus according to the fourth preferred embodiment of the present invention is suited not only to the type in which the load M to be weighed is held stationary on the weighing table 11, but also to the type in which the load M to be weighed is moving.

Also, since each load cell 1 may have an output sensitivity varying with the value of a load, a sensitivity correction (a weight sensitivity correction) is effected to the digital weight signal d1 outputted from each digital weighing means D1 and D2 in order to ensure an accurate measurement of the weight. At this time, since as hereinabove described each digital weight signal d1 accurately represents the load imposed on the respective load cell 1, the weight sensitivity correction can also be accurately effected to each digital weight signal d1. Accordingly, the weighing accuracy increases further. It is to be noted that the weight sensitivity correction is disclosed in the Japanese Laid-open Patent Publication No. 3-25325 published Feb. 4, 1991 (based on priority to the U.S. patent application Ser. No. 354,724 filed Jun. 12, 1989).

In the fourth preferred embodiment of the present invention, in addition to the above described effects, effects similar to those brought about in the second preferred embodiment of the present invention shown in FIG. 3 are equally appreciated. Also, the drift correction may be dispensed with as is the case with the second preferred embodiment of the present invention.

[Fifth Embodiment (Single $\Delta\Sigma$-type AD Converter in Multi-point Cell Design)]

A signal processing circuit employed in the weighing apparatus of the multi-point cell design is substantially similar to that shown in FIG. 6, but employs the single $\Delta\Sigma$-type AD converter 4 for both of the analog weighing means A1 and A2 and also employs the adder means 59 in place of the combination arithmetic means 58 employed in the combined weighing apparatus of FIG. 4. Because of the employment of the adder means 59, the analog weight signals a1 from the respective analog weighing means A1 and A2 are summed together so that the weight of the load M to be weighed that is placed on the weighing table 11 can be measured.

In this instance, since the analog weight signals a1 from the respective analog weighing means A1 and A2 are sequentially converted into the respective digital weight signals d1 by the $\Delta\Sigma$-type AD converter 4, there may be a delay (of, for example, 10 msec.) in weighing time between these digital weight signals d1. Accordingly, while the weighing apparatus according to the fifth preferred embodiment of the present invention can be applied to the type wherein the load M to be weighed moves above the weighing table 11, it is particularly suited to the type in which the load M to be weighed is held stationary on the weighing table 11, that is, the type in which the weight signal from each of the load cells does not vary with passage of time.

Even the fifth preferred embodiment of the present invention can exhibit effects similar to those brought about by the third preferred embodiment of the present invention shown in FIG. 4. It is to be noted that, even in the fifth preferred embodiment of the present invention, the drift correction may be dispensed with as is the case with the third preferred embodiment of the present invention.

INDUSTRIAL APPLICABILITY

As hereinbefore fully described, the weighing apparatus according to the present invention is suitably used as an electronic weighing apparatus utilizing a single weight detector (load cell), a combination weighing apparatus including a plurality of weight detectors and operable to perform a combining calculation of values detected by these weight detectors for selecting a combination equal to or close to a target value, and a weighing apparatus of multi-point cell design wherein a single weighing table is supported by a plurality of weight detectors and values detected by these weight detectors are summed together to determine the weight of a load to be weighed.

What is claimed is:

1. A weighing apparatus for weighing a load and for providing a digital weight signal used to display the weight of the load comprising:

at least one weighing means, said weighing means further comprising:

a weight detector for detecting the weight of the load and outputting an analog weight signal;

an amplifier for amplifying the analog weight signal; and an analog filter with a first cut off frequency for reducing a high frequency component of the amplified analog weight signal which is higher than said first cut-off frequency; and at least one delta-sigma analog-to-digital converter, said converter further comprising:

a modulator for modulating the amplified analog weight signal output from the analog filter into a digital signal, and a digital filter with a second cut-off frequency for reducing a high frequency component of the digital signal which is higher than said second cut-off frequency, wherein the second cut-off frequency is higher than the first cut-off frequency, thereby to provide the digital weight signal.

2. The weighing apparatus as claimed in claim 1, further comprising:

a first switching means for switching between a first state, wherein the analog weight signal is fed from the amplifier and a second state, wherein input terminals of the amplifier are short-circuited;

a second switching means for switching between a first state, wherein the analog filter performs a filtering function and a second state, wherein the analog filter performs a buffering function;

a mode selecting means for switching each of the first and second switching means over to the first state during a weighing mode and for switching each of the first and second switching means over to the second state during a correction mode; and a correcting means for storing a digital signal from the delta-sigma analog-to-digital converter as a drift signal during the correction mode and for providing a corrected digital weight signal by subtracting the drift signal from the digital weight signal obtained from the delta-sigma analog-to-digital converter during the weighing mode.

3. The weighing apparatus as claimed in claim 2, wherein said analog filter comprises a negative feed-back amplifier and an integrator circuit connected with a positive input terminal of the negative feed-back amplifier.

4. The weighing apparatus as claimed in claim 1 comprising a plurality of weighing means and further comprising:

plurality of delta-sigma analog-to-digital converters, wherein each weighing means has a respective analog-to-digital converter;

a conversion control means for causing delta-sigma analog-to-digital converter of each respective weighing means to perform conversion at a synchronized timing; and a combination arithmetic means for performing a combining calculation of the respective digital weight signals from the plurality of weighing means and for selecting a target group, wherein said group comprises the weighing means which are generating the digital weight signal of a combination substantially equal to a target value.

5. The weighing apparatus as claimed in claim 1 comprising plurality of weighing means, wherein the delta-sigma analog-to-digital converter is connected in common with the plurality of weighing means, and further comprising:

a change-over means for supplying the analog weight signals from the plurality of analog weighing means selectively to the delta-sigma analog-to-digital converter; and a combining arithmetic means for performing a combining calculation of the respective digital weight signals, outputted from the delta-sigma analog-to-digital converter in correspondence with the analog signals from the plurality of weighing means, and for selecting a target group, wherein said group comprises the weighing means which are generating the digital weight signal of a combination substantially equal to a target value.

6. The weighing apparatus as claimed in claim 1 comprising plurality of weighing means further comprising:

a plurality of delta-sigma analog-to-digital converters wherein each weighing means has a respective analog-to-digital converter;

a conversion control means for causing each delta-sigma analog-to-digital converter of each respective weighing means to perform conversion at a synchronized timing; and an adder means for summing the digital weight signals from the plurality of weighing means together thereby to determine the weight of the load.

7. The weighing apparatus as claimed in claim 1 comprising a plurality of weighing means wherein the delta-sigma analog-to-digital converter is connected in common with the plurality of weighing means, and further comprising:

a change-over means for supplying the analog weight signals from the plurality of weighing means selectively to the delta-sigma analog-to-digital converter; and an adder means for summing together the digital weight signals, outputted from the delta-sigma analog-to-digital converter in correspondence with the analog weight signals from the weighing means, thereby to determine the weight of the load.

8. The weighing apparatus as claimed in claim 4, wherein each of the plurality of weighing means further comprises a first switching means for switching between a first state in which the analog weight signal is fed to the amplifier and a second state in which input terminals of the amplifier are short-circuited, and a second switching means for switching between a first state in which the analog filter performs a filtering function, and a second state in which the analog filter performs a buffering function, and further comprising:

a mode selecting means for switching each of the first and second switching means over to the first state during a weighing mode and for switching each of the first and second switching means over to the second state during a correction mode; and a correcting means for storing a digital signal from the delta-sigma analog-to-digital converter as a drift signal during the correction mode and for providing a corrected digital weight signal by subtracting the drift signal from the digital weight signal obtained from the delta-sigma analog-to-digital converter during the weighing mode.

9. The weighing apparatus as claimed in claim 5, wherein each of the plurality of weighing means further comprises a first switching means for switching between a first state in which the analog weight signal is fed to the amplifier, and a second state in which input terminals of the amplifier are short-circuited, and a second switching means for switching over between a first state in which the analog filter performs a filtering function, and a second state in which the analog filter performs a buffering function, and further comprising:

a mode selecting means for switching each of the first and second switching means over to the first state during a weighing mode and for switching each of the first and second switching means over to the second state during a correction mode; and a correcting means for storing the digital signal from the delta-sigma analog-to-digital converter as a drift signal during the correction mode and for providing a corrected digital weight signal by subtracting the drift signal from the digital weight signal obtained from the delta-sigma analog-to-digital converter during the weighing mode.

10. The weighing apparatus as claimed in claim 6, wherein each of the plurality of weighing means further comprises a first switching means for switching between a first state in which the analog weight signal is fed to the amplifier, and a second state in which input terminals of the amplifier are short-circuited, and a second switching means for switching between a first state in which the analog filter performs a filtering function, and a second state in which the analog filter performs a buffering function, and further comprising:

a mode selecting means for switching each of the first and second switching means over to the first state during a weighing mode and for switching each of the first and second switching means over to the second state during a correction mode; and a correcting means for storing the digital signal from the delta-sigma analog-to-digital converter as a drift signal during the correction mode and for providing a corrected digital weight signal by subtracting the drift signal from the digital weight signal obtained from the delta-sigma analog-to-digital converter during the weighing mode.

11. The weighing apparatus as claimed in claim 7, wherein each of the plurality of weighing means further comprises a first switching means for switching between a first state in which the analog weight signal is fed to the amplifier, and a second state in which input terminals of the amplifier are short-circuited, and a second switching means for switching between a first state in which the analog filter performs a filtering function, and a second state in which the analog filter performs a buffering function, and further comprising:

a mode selecting means for switching each of the first and second switching means over to the first state during a weighing mode and for switching each of the first and second switching means over to the second state during a correction mode; and a correcting means for storing the digital signal from the delta-sigma analog-to-digital converter as a drift signal during the correction mode and for providing a corrected digital weight signal by subtracting the drift signal from the digital weight signal obtained from the delta-sigma analog-to-digital converter during the weighing mode.

12. A weighing apparatus for weighing a load and for providing a digital weight signal used to display the weight of the load comprising:

at least one weighing means, said weighing means further comprising:

a weight detector for detecting the weight of the load and outputting an analog weight signal;

an amplifier for amplifying the analog weight signal; and an analog filter with a first cut off frequency for reducing a high frequency component of the amplified analog weight signal which is higher than said first cut-off frequency, wherein the first cut off frequency is of a value corresponding to a mechanical vibration of the weight detector; and at least one delta-sigma analog-to-digital converter said converter further comprising:

a modulator for modulating the amplified analog weight signal output from the analog filter into a digital signal, and a digital filter with a second cut off frequency for reducing a high frequency component of the digital signal which is higher than said second cut-off frequency, wherein the second cut-off frequency is higher than the first cut-off frequency, thereby to provide the digital weight signal.

13. The weighing apparatus as claimed in claim 12 comprising a plurality of weighing means and further comprising:

a plurality of delta-sigma analog-to-digital converters, wherein each weighing means has a respective analog-to-digital converter;

a conversion control means for causing the delta-sigma analog-to-digital converter of each respective weighing means to perform conversion at a synchronized timing; and a combination arithmetic means for performing a combining calculation of the respective digital weight signals from the plurality of weighing means and for selecting a target group, wherein said group comprises the weighing means which are generating the digital weight signal of a combination substantially equal to a target value.

14. The weighing apparatus as claimed in claim 12, comprising a plurality of weighing means wherein the delta-sigma analog-to-digital converter is connected in common with the plurality of weighing means and further comprising:

a change-over means for supplying the analog weight signals from the plurality of analog weighing means selectively to the delta-sigma analog-to-digital converter; and a combining arithmetic means for performing a combining calculation of the respective digital weight signals, outputted from the delta-sigma analog-to-digital converter in correspondence with the analog signals from the plurality of weighing means, and for selecting a target group, wherein said group comprises the weighing means which are generating the digital weight signal of a combination substantially equal to a target value.

15. The weighing apparatus as claimed in claim 12 comprising a plurality of weighing means and further comprising:

a plurality of delta-sigma analog-to-digital converters wherein each weighing means has a respective analog-to-digital converter;

a conversion control means for causing each delta-sigma analog-to-digital converter of each respective weighing means to perform conversion at a synchronized timing; and an adder means for summing the digital weight signals from the plurality of weighing means together thereby to determine the weight of the load.

16. The weighing apparatus as claimed in claim 12 comprising a plurality of weighing means wherein the delta-sigma analog-to-digital converter is connected in common with the plurality of weighing means and further comprising:

a change-over means for supplying the analog weight signals from the plurality of weighing means selectively to the delta-sigma analog-to-digital converter; and an adder means for summing together the digital weight signals, outputted from the delta-sigma analog-to-digital converter in correspondence with the analog weight signals from the weighing means, thereby to determine the weight of the load to be weighed.

* * * * *